(12) United States Patent (10) Patent No.: US 12,675,288 B2
Tarocchi et al. (45) Date of Patent: *Jul. 7, 2026

(54) PREPOPULATED CONTAINER IMAGES REPOSITORIES FOR CI/CD ENVIRONMENTS

(71) Applicant: Red Hat, Inc., Raleigh, NC (US)

(72) Inventors: Andrea Tarocchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,426

(22) Filed: Jan. 9, 2024

(65) Prior Publication Data

US 2024/0231809 A1 Jul. 11, 2024

Related U.S. Application Data

(63) Continuation of application No. 17/391,515, filed on Aug. 2, 2021, now Pat. No. 11,893,382.

(51) Int. Cl.
*G06F 9/44* (2018.01)
*G06F 8/71* (2018.01)
(52) U.S. Cl.
CPC ...................................... *G06F 8/71* (2013.01)
(58) Field of Classification Search
None
See application file for complete search history.

(56) References Cited

U.S. PATENT DOCUMENTS

| | | | |
|---|---|---|---|
| 8,255,362 B2 | 8/2012 | Johnson et al. | |
| 10,528,337 B1* | 1/2020 | Varadharajan Kannan | ................. G06F 8/71 |
| 10,812,582 B2 | 10/2020 | Spillane et al. | |
| 2006/0173993 A1* | 8/2006 | Henseler | ................... G06F 8/63 709/224 |
| 2007/0198657 A1* | 8/2007 | Saliba | ................. G06F 16/1767 709/219 |
| 2016/0352868 A1* | 12/2016 | Yi | ........................ H04L 67/568 |
| 2017/0322852 A1* | 11/2017 | Subramanya | ....... G06F 11/1417 |
| 2018/0088993 A1* | 3/2018 | Gerdesmeier | ......... G06F 9/5005 |

(Continued)

FOREIGN PATENT DOCUMENTS

| | | |
|---|---|---|
| CN | 111209082 A | 5/2020 |
| CN | 106528224 B | 8/2020 |

(Continued)

OTHER PUBLICATIONS

Zhuo Huang et al., "FastBuild: Accelerating Docker Image Building for Efficient Development and Deployment of Container", 2019 (Year: 2019).*

(Continued)

*Primary Examiner* — Lanny N Ung
(74) *Attorney, Agent, or Firm* — Womble Bond Dickinson (US) LLP

(57) ABSTRACT

A method is described that includes executing a container image that is configured as an image repository mirror for a remote server and executing an application that is configured to provide a request for one or more images to the remote server. The method further includes reconfiguring the application to cause the application to provide the request for the one or more images to the container image instead of the remote server.

17 Claims, 6 Drawing Sheets

300 executing, by the processing device, a container image that is configured as an image repository mirror for a remote server
302 executing, by the processing device, an application to cause the application to provide a request for one or more images to the container image
304 determining, by the container image, an absence of the one or more images in the container image
306 retrieving, by the container image responsive to determining the absence of the one or more images, the one or more images from the remote storage
308 providing, by the container image, the one or more images retrieved from the remote storage to the application
310

(56) References Cited

U.S. PATENT DOCUMENTS

| | | | |
|---|---|---|---|
| 2018/0096005 A1 | 4/2018 | Nagaraja et al. | |
| 2019/0079788 A1* | 3/2019 | Ruty ..................... | G06F 3/0665 |
| 2019/0310775 A1 | 10/2019 | Chen et al. | |
| 2021/0004251 A1 | 1/2021 | Skourtis et al. | |
| 2021/0089215 A1 | 3/2021 | Ashraf et al. | |
| 2021/0097477 A1 | 4/2021 | Zhang et al. | |
| 2021/0208863 A1* | 7/2021 | Kuriata ............... | G06F 12/0238 |
| 2022/0244949 A1* | 8/2022 | Iqbal ....................... | G06F 9/547 |
| 2023/0031354 A1* | 2/2023 | Tahenakos .......... | G06F 9/45558 |

FOREIGN PATENT DOCUMENTS

| | | |
|---|---|---|
| CN | 111857959 A | 10/2020 |
| WO | 2019095936 A1 | 5/2019 |

OTHER PUBLICATIONS

Ayres et al., Department of Computer Science and Informatics, Cyber Technology Institute, De Montfort University, Leicester LE1 9BH, UK, "Continuous Automotive Software Updates through Container Image Layers," Published on Mar. 7, 2021, located at https://www.mdpi.com/2079-9292/10/6/739/htm.

* cited by examiner

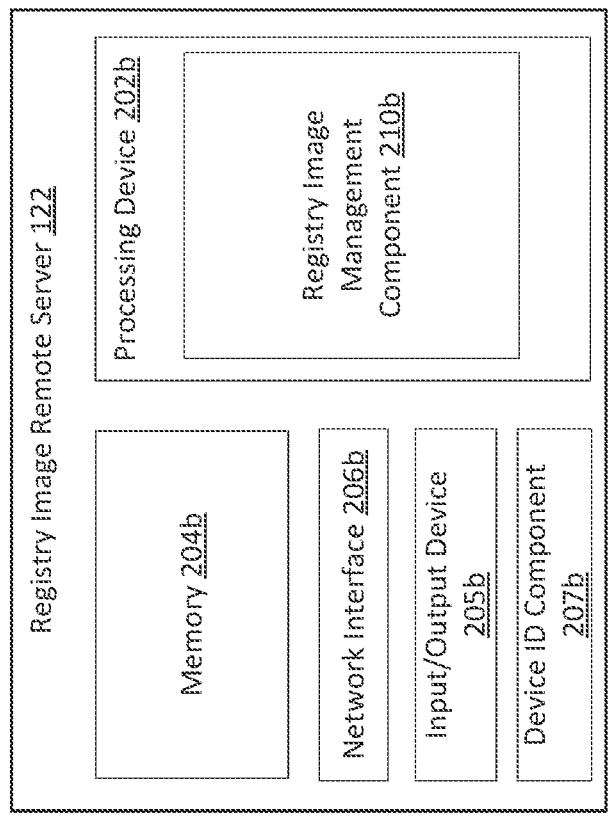

Registry Image Remote Server 122

Processing Device 202b

Registry Image Management Component 210b

Memory 204b

Network Interface 206b

Input/Output Device 205b

Device ID Component 207b

FIG. 2B

Continuous Integration System 102

Processing Device 202a

Application Development Component 210a

Container Image 106

Application Under Test (AUT) 107

Developer Application 270a

Memory 204a

Network Interface 206a

Input/Output Device 205a

Device ID Component 207a

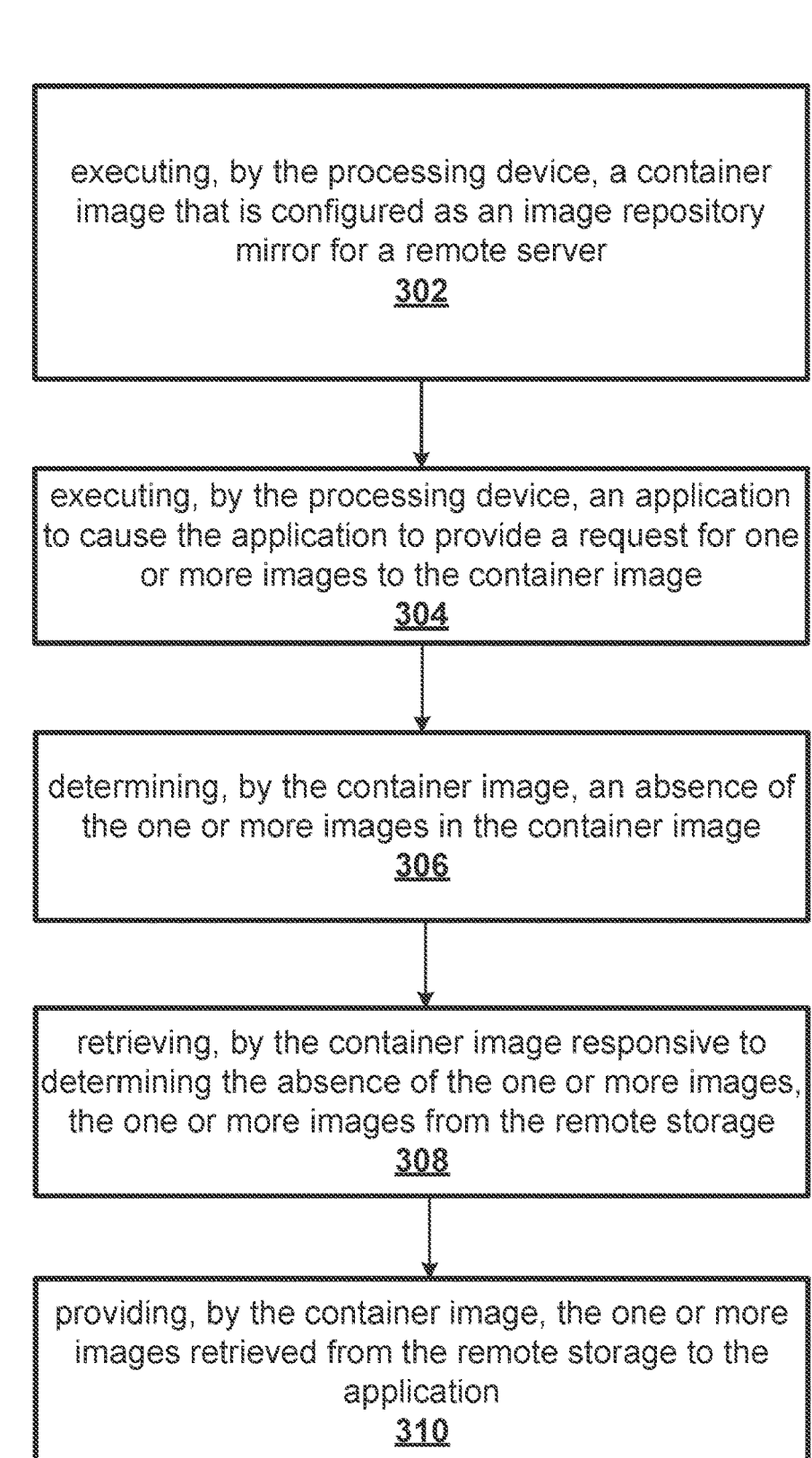

executing, by the processing device, a container image that is configured as an image repository mirror for a remote server
302 executing, by the processing device, an application to cause the application to provide a request for one or more images to the container image
304 determining, by the container image, an absence of the one or more images in the container image
306 retrieving, by the container image responsive to determining the absence of the one or more images, the one or more images from the remote storage
308 providing, by the container image, the one or more images retrieved from the remote storage to the application
310

PREPOPULATED CONTAINER IMAGES REPOSITORIES FOR CI/CD ENVIRONMENTS

CROSS-REFERENCE TO RELATED APPLICATIONS

This application is a continuation of U.S. application Ser. No. 17/391,515, filed on Aug. 2, 2021, the contents of which are hereby incorporated by reference.

TECHNICAL FIELD

The present disclosure relates generally to software development, and more particularly, to systems and methods for prepopulating a container image repository for continuous integration (CI/CD) environments using volumes and/or layered images.

BACKGROUND

Continuous Integration and Continuous Deployment (CI/CD) is a method to frequently deliver apps to customers by introducing automation into the stages of app development. The main concepts attributed to CI/CD are continuous integration, continuous delivery, and continuous deployment. CI/CD is a solution to the problems integrating new code can cause for development and operations teams. Specifically, CI/CD introduces ongoing automation and continuous monitoring throughout the lifecycle of apps, from integration and testing phases to delivery and deployment. Taken together, these connected practices are often referred to as a "CI/CD pipeline" and are supported by development and operations teams working together in an agile way with either a DevOps or Site reliability engineering (SRE) approach.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram depicting an example of the continuous integration (CI) system 102 in FIG. 1, according to some embodiments;

FIG. 2B is a block diagram depicting an example of the registry image (RI) remote server 122 of the environment in FIG. 1, according to some embodiments;

FIG. 3 is a flow diagram depicting a method for prepopulating a container image repository for continuous integration (CI/CD) environments using volumes, according to some embodiments;

DETAILED DESCRIPTION

Figure 1:
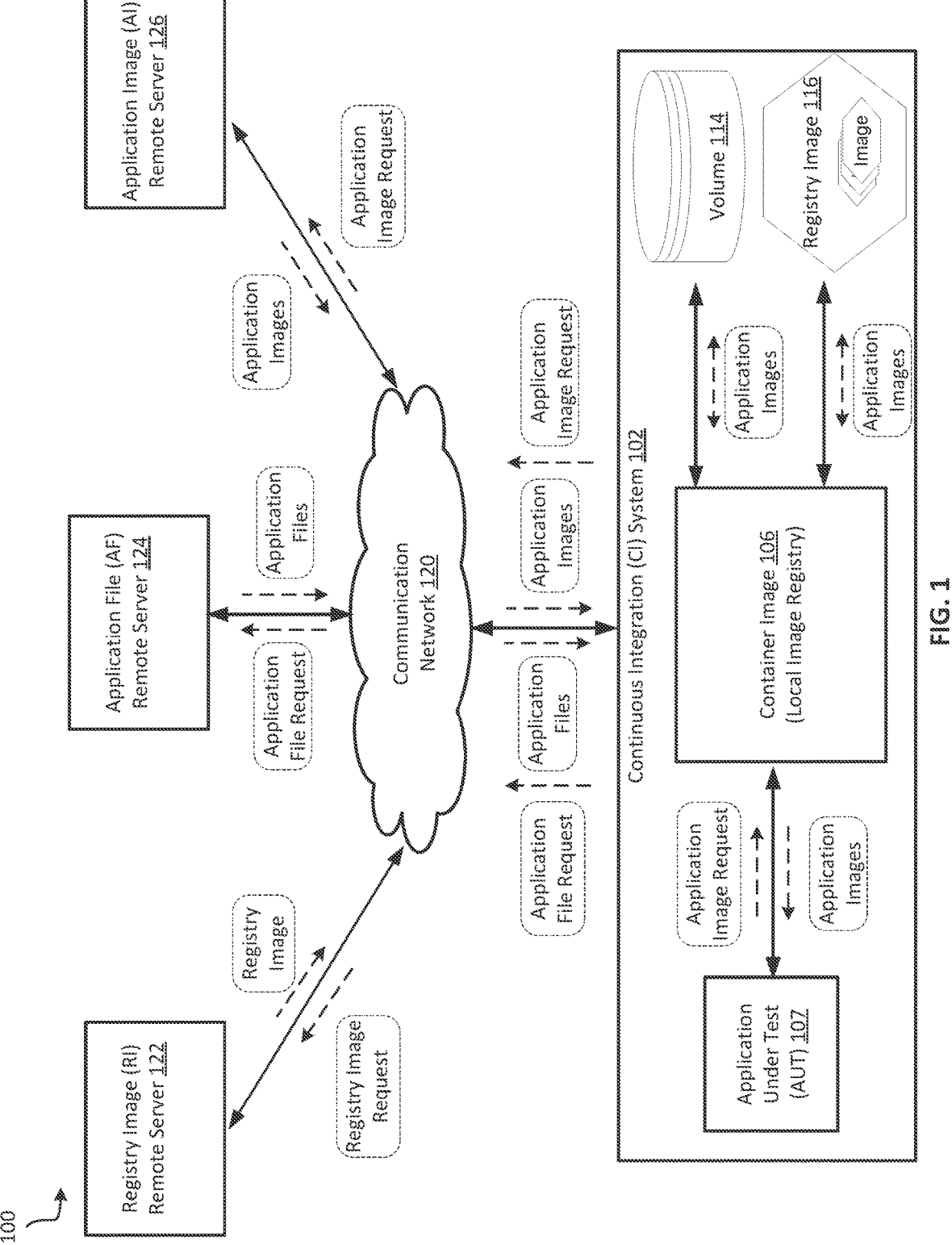
FIG. 1 is a block diagram depicting an example environment for prepopulating a container image repository for continuous integration (CI/CD) environments using volumes and/or layered images, according to some embodiments.

Building modern software in a reliable and effective way involves running builds and tests in a CI environment. For large organizations and open source projects, a software developer may use an internet host for the software development and version control. The process may involve running a number of image containers to spin up companion services used during the testing phase, such as databases and message brokers.

Suppose a project that is executing on a computing device needs several images during its CI build/test runs. The project will fetch those images from a remote repository and store the images to a temporary folder on a local drive of the computing device. Even though the computing device has a local copy of the images, the project will continually retrieve these images from the remote repository despite having already pre-cached the images on its local drive.

However, a project that continually retrieves the images that it uses to execute from the remote repository may experience significant delays in retrieving those images, which in turn, causes a delay (and in some instances, completely halts) in the development of the project and excessive consumption of networking resources. For example, continually retrieving images from the remote repository over a networking infrastructure may overburden the network infrastructure by increasing network congestion and power consumption by the network infrastructure. The repeated requests by the project may also overburden the remote repository, causing it to shut down or disconnect from the network. As such, the remote repository would fail to provide the images to the project in a timely manner. In some instances, the host of the remote repository may install downloading quotas that limit the amount of bandwidth and/or images that a project may retrieve from the remote repository, which may also lead to a significant delay in the development of the project.

Aspects of the present disclosure address the above-noted and other deficiencies by prepopulating a container image repository for continuous integration (CI/CD) environments using volumes and/or layered images to allow a project that is executing on a computing device to retrieve images from the container image repository that is also executing on the computing device instead of retrieving the images from a remote repository. Benefits of using the one or more embodiments of the present disclosure for prepopulating a container image repository may include a reduction in the consumption of computing/networking resources by minimizing or eliminating the number of image retrievals from a remote repository, as well as, reducing the time to develop software during the CI/CD process.

As discussed in greater detail below, a container image may be created to act as an image repository mirror for a remote repository using volumes and/or layered images. The container image may be pre-populated with one or more of the images that a project (e.g., sample code, application under test) may use during a build and/or test of the project. The container image may be configured in the user's CI/CD pipelines, such that the user's pipeline may be guaranteed to avoid any risk of not accessing a remote image repository and will have some or all of the images locally stored. An example procedure for a fully functional registry instance that may be used as a first-level cache may include: starting the registry image locally and mounting an explicit volume in the container used to contain the binary files and metadata to be reused later; configuring a client process to use the registry as a mirror for the remote server; identifying the complete list of images that are used by a project; filtering out the local images (e.g., all those that wouldn't be available on the remote repositories); running sample code and/or an application under test that accesses the images that are cached; and/or stopping the registry image. The example procedure may allow having all the local data required to bring up a fully populated mirror instance that could be used even in a completely offline environment. The volume (or registry layers) that has been populated may now be re-attached to an ad-hoc registry instance and serve the full content, thereby allowing for the re-using of the images in a CI/CO environment without overburdening a network infrastructure with downloads of the images across a network.

FIG. 1 is a block diagram depicting an example environment prepopulating a container image repository for continuous integration (CI/CD) environments using volumes and/or layered images, according to some embodiments. The environment 100 includes a continuous integration (CI) system 102, registry image (RI) remote server 122, application file (AF) remote server 124, and an application image (AI) remote server 126 that are each communicably coupled together via a communication network 120. The CI system 102 includes and/or executes an application (shown in FIG. 1 as, "application under test 107"). The CI system 102 includes and/or executes a container image 106 (e.g., a local registry image). In some embodiments, a volume 114 (e.g., a directory in a file system) may be mounted in the container image 106. In some embodiments, the container image 106 may store a registry image in a local storage (not shown in FIG. 1) and/or local memory (e.g., memory 202a in FIG. 2A).

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

As shown in FIG. 1, the CI system 102 may execute the container image 106, where the container image 106 is configured as an image repository mirror for the AI remote server 126 (sometimes referred to as, "remote storage"). The CI system 102 may execute an application under test (AUT) 107 to cause the application to provide a request (shown in FIG. 1 as, "Application Image Request") for one or more images (e.g., application images) to the container image 106. The CI system 102 may determine an absence of the one or more images in the container image 106. The CI system 102 may retrieve, responsive to determining the absence of the one or more images, the one or more images (shown in FIG. 1 as, "Application Images") from the AI remote server 126. The CI system 102 may provide the one or more images that were retrieved from the AI remote server 126 to the AUT 107. The CI system 102 may store the one or more images in one or more volumes 114 of the container image 106, such that the CI system 102 may retrieve the one or more images from the container image 106 instead of the AI remote server 126 if the AUT 107 sends a second request for the one or more images.

The CI system 102 may send a request (shown in FIG. 1 as, "Registry Image Request") to RI remote server 122 (sometimes referred to as, "remote storage") for a registry image. In response to receiving the request, the RI remote server 122 may send a registry image (shown in FIG. 1 as, "Registry Image). In some embodiments, the registry image may be an empty registry image. In some embodiments, the CI system 102 may store the registry image (shown in FIG. 1 as, "registry image 116") in a local memory or a local storage. The CI system 102 may determine a full set of images that are associated with an execution of the AUT 107. The CI system 102 may determine an absence of a subset of images of the full set of images in the registry image 116. The CI system 102 may retrieve, responsive to determining the absence of the subset of images, the subset of images from the AI remote server 126. The CI system 102 may store the subset of images in one or more layers of the registry image 116 such that the registry image 116 includes the full set of images. By storing the full set of images in the registry image 116, the CI system 102 may retrieve one or more images from the registry image 116 instead of the AI remote server 126 if the AUT 107 sends a second request for the one or more images.

Although FIG. 1 shows only a select number of computing devices (e.g., CI system 102, RI server 122, AF remote server 124, and an AI remote server 126) registry images (e.g., registry image 116), and/or data volumes (e.g., file system volume 114); the environment 100 may include any number of computing devices and/or data volumes that are interconnected in any arrangement to facilitate the exchange of data between the computing devices.

FIG. 2A is a block diagram depicting an example of a continuous integration system 102 in FIG. 1, according to some embodiments. While various devices, interfaces, and logic with particular functionality are shown, it should be understood that the continuous integration system 102 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The continuous integration system 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the CI system 102. In some embodiments, the processing device 202a and the memory 204a form various processing devices and/or circuits described with respect to the CI system 102. The instructions include code from any suitable computer programming language such as, but not limited to, C, C++, C #, Java, JavaScript, VBScript, Perl, HTML, XML, Python, TCL, and Basic.

The processing device 202a may include and/or execute an application (shown in FIG. 2A as, "Developer Application 270a") that is displayed on a computer screen of the CI system 102, and is configured to allow a user of the CI system 102 to use operating system (OS)-level virtualization to package software into a container image and to execute the container image. For example, the developer application 270a may be configured to generate a container image using one or more files of a software application project. In some embodiments, the developer application 270a may be the open-source version of Docker. In some embodiments, the developer application 270a includes an application programming interface (API; sometimes referred to as, "Docker API") for interacting with a daemon (sometimes referred to as, "Docker Engine API"), as well as software development kits (SDKs). In some embodiments, the SDKs allow a user of the CI system 102 to build and scale applications (e.g., Docker apps) and solutions quickly and easily. In some embodiments, the developer application 270a is configured to display information (e.g., notifications, messages, image requests, outputs from the AUT 107, etc.) on a screen of the CI system 102. In some embodiments, the developer application 270a may be configured to perform some or all of the same functionality (as discussed herein) as the application development component 210a.

The processing device 202a may include and/or execute an application (shown in FIG. 2A as, "Application Under Test (AUT) 107") that is displayed on a computer screen of the CI system 102. The AUT 107 may be an application that is or has undergoing one or more stages of a software development process for the purpose of developing the application into a final product for private use, public use, and/or commercial use. In some embodiments, a user of the CI system 102 may modify the AUT 107 and/or execute the AUT 107. For example, a user of CI system 102 may edit the source code of the AUT 107, compile the source code of the AUT 107 to generate an executable code, and execute the executable code. In some embodiments, the AUT 107 may be configured to need one or more images in order to completely execute (e.g., execute without error and/or interruption). In some embodiments, an execution of the AUT 107 may cause the AUT 107 to send a request (or a plurality of requests) for one or more images. In some embodiments, the AUT 107 may be configured to send a request (shown in FIG. 1 as, "Application Image Request") to a local storage, a container image (e.g., container image 106), and/or a remote server (e.g., AI remote server 126) for one or more images that are needed to completely execute, where the request causes the receiving entity to send the one or more images (shown in FIG. 1 as, "Application Images"). In some embodiments, the AUT 107 may be configured to retrieve one or more images from a local storage, a container image (e.g., container image 106), and/or a remote server (e.g., AI remote server 126) without sending a request.

The processing device 202a may execute an application development component 210a. In some embodiments, the application development component 210a may be configured to retrieve a registry image from the RI remote server 122 by sending a request (shown in FIG. 1 as, "Registry Image Request") to the RI remote server 122 for a registry image, which causes the RI remote server 122 to send the registry image to the application development component 210a. In some embodiments, the application development component 210a may be configured to retrieve a registry image from a local memory (e.g., memory 204a) or a local storage.

In some embodiments, the application development component 210a may be configured to generate (e.g., build, create) its own registry image based on one or more application files (e.g., source code, executable code, libraries, dependencies, configuration files, etc.). In some embodiments, the application development component 210a may be configured to retrieve the one or more application files from a local memory (e.g., memory 204a) and/or a local storage. In some embodiments, the application development component 210a may be configured to retrieve the one or more application files from the AI remote server 126 (sometimes referred to as, "remote storage") by sending a request (shown in FIG. 1 as, "Application File Request") to the AF remote server 122 for one or more application files, which causes the AF remote server 124 to send the one or more application files (shown in FIG. 1 as, "Application Files") to the application development component 210a.

In some embodiments, an image (sometimes referred to as, "application image") may be a file that includes and/or is configured to execute application code (or any computer code) in a container image (e.g., container image 106). In some embodiments, an image may be configured as a read-only template that includes a set of instructions to build a container image. In some embodiments, an image may be used to store and/or distribute applications. In some embodiments, an image may contain one or more applications files (e.g., application code, libraries, system tools, dependencies, configuration/setting files, environment variables, runtimes, and other files needed to make an application execute). In some embodiments, images may be available in different tagged versions. In some embodiments, an image may have one or more layers, where each layer originates from the previous layer but is different from it. In some embodiments, a read-only layers of an image may be shared between any container image that is started from the same image. In some embodiments, each layer of an image may include a set of differences from the layer before it. In some embodiments, the layers of an image may be stacked on top of each other. In some embodiments, an image may be associated (e.g., linked, coupled) with a text document (sometimes referred to as, "Dockerfile") that contains one or more (or all) the commands that a computing device may call on the command line to assemble an image. In some embodiments, each layer of an image may represent an instruction in the text document that is associated with the image.

In some embodiments, a registry image is a type of image that is configured to perform as a registry, which is a storage and content delivery system for images (sometimes referred to as, "Docker images"). In some embodiments, a computing device or an application (e.g., AUT 107) that is executing on the computing device may interact with an executing/ running registry image (e.g., a container image) by sending a push command (e.g., to send images to the registry for storing) and/or a pull command (e.g., to retrieve images from the registry).

In some embodiments, the application development component 210a may be configured to generate the container image 106 from one or more images and/or test documents (e.g., Dockerfile) that are associated with the images. In some embodiment, the application development component 210a may be configured to make changes (e.g., writing new files/data, modifying existing files/data, deleting files, etc.) to a running container image (e.g., container image 106) by writing to the writable container layer. In some embodiments, the application development component 210a may be configured to generate the container image 106 by adding a writable layer (sometimes referred to as, "container layer") on top of the underlying layers. In some embodiments, the application development component 210a may be configured to delete the container image 106 by deleting the writable layer, but where the underlying image remains unchanged.

In some embodiments, the container image 106 may be a standalone, executable package of software that packages up (e.g., bundles, collects, groups) one or more application files (e.g., code, dependencies, etc.) so that an application (e.g., AUT 107) can run quickly and/or reliably from one computing environment to another. In some embodiments, container images may be isolated from one another, but communicate with each other through channels. In some embodiments, the container image 106 may be an unchangeable, static file that includes executable code that allows the container image to run an isolated process. In some embodiments, a major difference between the container image 106 and an image (e.g., registry image) is that the container image 106 includes a top writable layer. In some embodiments, the container image 106 may be compiled from one or more file system layers that are built onto a parent or base image. In some embodiments, the container image 106 may be stored in a private registry or a public registry.

In some embodiments, the application development component 210a may be configured to generate the container image 106 from a registry image, where the container image 106 is configured as an image repository mirror for the AI remote server 126. In some embodiments, the registry image may be an empty registry image, such that there are no images in the registry image. In some embodiments, the container image 106 may be configured to mirror all branches (e.g., multiple versions of the repository), commits (e.g., a history of all changes to the repository), tags (e.g., a tag marks a specific commit at a point in the repository history), directories, and/or files (e.g., images, data) that are in the AI remote server 126. In some embodiments, the container image 106 may be configured to hold a duplicate copy of all directories and/or files (e.g., images, data) that are in the AI remote server 126. For example, the container image 106 may be configured to hold a duplicate copy of images that are in the AI remote server 126 by retrieving (e.g., pulling) one or more images (shown in FIG. 1 as, "application images") from the remote server 126 and storing the retrieved images in one or more volumes (shown in FIG. 1 as, "File System Volume 114") of the container image 106.

In some embodiments, the application development component 210a may be configured to launch and/or execute the container image 106 (e.g., execute an instance of the container image 106). In some embodiments, the application development component 210a may be configured to configure (e.g., initialize, program, modify) the container image 106 to perform as an image repository mirror for the AI remote server 126. In some embodiments, the application development component 210a may be configured to configure the container image 106 to perform as an image repository mirror for the AI remote server 126 by mounting a volume (e.g., a directory in a file system, a logical drive, etc.) in the container image 106. In some embodiments, the application development component 210a may be configured to configure the container image 106 to perform as an image repository mirror for the AI remote server 126 by mounting a directory in a file system associated with the local storage of the processing device in the container image 106. For example, the application development component 210a may mount a file system by incorporating a file system of the processing device into the container image 106. In some embodiments, the application development component 210a may be configured to create a mount point, which is a locally available link (e.g., reference, pointer) through which the images of the container image 106 may be accessed by another computing device and/or an application that is executing on the other computer device. In some embodiments, the application development component 210a may be configured to send the link to a computer device (e.g., a different CI system).

In some embodiments, the application development component 210a may be configured to unmount a volume or a directory in a file system associated with the local storage of the processing device from the container image 106. In some embodiments, the application development component 210a may be configured to stop (e.g., terminate, halt, pause) the execution of the container image 106 or the execution of an instance of the container image 106. In some embodiments, stopping the execution of the container image 106 does not delete the images from the local storage or in the container image 106, such that the application development component 210a may re-launch and/or re-execute the container image 106 and the container image 106 may have access to the same images that were available prior to being stopped by the application development component 210a.

In some embodiments, the application development component 210a may be configured to launch (e.g., start, trigger, activate) the AUT 107 to cause the AUT 107 to execute on the processing device 202a. In some embodiments, the application development component 210a may be configured to configure the AUT 107 to send (e.g., direct) a request for one or more images to the container image 106 instead of the AI remote server 126. In some embodiments, the execution of the AUT 107 by the application development component 210a causes the AUT 107 to provide a request for one or more images to the container image 106 instead of the AI remote server 126.

In some embodiments, the AUT 107 is requesting an image that includes a dynamic link library (DLL) component (e.g., a component that contains functions, computer code/instructions, and/or data that can be used by another module), a software driver (e.g., a component that provides a programming interface to control and manage a lower level interface that may be linked to physical or virtual hardware devices), a user interface component (e.g., a component used to display information in a webpage and/or application), a model component (e.g., a component that handles requests or events including business rules and/or data processing), a controller component (e.g., a component that decides what components to call for a particular request or event), a data access object or component (e.g., a component that provides an abstract interface for a database), a service component (e.g., a network service, a web service) a web resource, a plugin component (e.g., a component designed to extend the functionality of an application or system), and/or an application programming interface (API) component (e.g., a component that can be reused across multiple systems and applications that can be packaged and distributed as an API).

In some embodiments, the container image 106 may be configured to determine the one or more images that are associated with the execution of the AUT 107 by the processing device 202a. In some embodiments, the container image 106 may be configured to determine the one or more images that are associated with the execution of the AUT 107 by the processing device 202a based on receiving a request for the one or more images from the AUT 107. In some embodiments, the container image 106 may be configured to determine a full set (e.g., a list) of images that are associated with the execution of the AUT 107 by the processing device 202, where the full set of images are needed by the AUT 107 in order to execute without error and/or interruption.

In some embodiments, the container image 106 may be configured to determine, responsive to receiving a request for one or more images, an absence of the one or more images in the container image 106. For example, the container image 106 may search a volume in the container image 106 for images that the AUT 107 is requesting and confirm that the requested images are not stored (e.g., are missing) in container image 106 or that the images in the container image 106 are corrupted (e.g., cannot be used by the AUT 107). In some embodiments, the container image 106 may be configured to determine, responsive to receiving a request for one or more images, an absence of a full set of images associated with the execution of the AUT 107 by the processing device 202a.

In some embodiments, the container image 106 may be configured to determine an absence of one or more images associated with the execution of the AUT 107 by the processing device 202a without receiving a request for images from the AUT 107. For example, the container image may scan (e.g., read) the AUT 107 to identify instructions (e.g., code) that request one or more images. In some embodiments, the container image 106 may be configured to determine (e.g., via scanning the AUT 107) an absence of a subset or a full set of images associated with the execution of the AUT 107 by the processing device 202a without receiving a request for images from the AUT 107.

In some embodiments, the container image 106 may be configured to retrieve (e.g., fetch), responsive to determining the absence of the one or more images in the container image 106, the one or more images from the AI remote server 126. In some embodiments, the container image 106 may be configured to retrieve (e.g., fetch), responsive to determining the absence of a subset or a full set in the container image 106, the subset or the full set images from the AI remote server 126.

In some embodiments, the container image 106 may be configured to store (e.g., record) the one or more images (including a subset or full set of images) that it retrieves from the AI remote server 126 in the container image 106 (e.g., in one or more volumes in the container image 106). In some embodiments, the container image 106 may be configured to store the one or more images that it retrieves from the AI remote server 126 in the container image 106. In some embodiments, the container image 106 may be configured to store the one or more images that it retrieves from the AI remote server 126 in a directory in a file system that is mounted in the container image 106.

In some embodiments, the container image 106 may be configured to determine, responsive to receiving a request for one or more images, a presence of the one or more images in one or more volumes in the container image 106. For example, the container image 106 may search the one or more volumes in the container image 106 for the images that the AUT 107 is requesting and confirm that the requested images are stored in the one or more volumes in the container image 106 and are uncorrupted (e.g., can be used by the AUT 107). In some embodiments, the container image 106 may be configured to determine, responsive to receiving a request for one or more images, a presence of a full set (or subset) of images associated with the execution of the AUT 107 in one or more volumes in the container image 106.

In some embodiments, the container image 106 may be configured to retrieve, responsive to determining the presence of the one or more images in the container image 106, the one or more images from the one or more volumes in the container image 106. In some embodiments, the container image 106 may be configured to retrieve, responsive to determining the presence of the one or more images in the container image 106, the one or more images from a file system that is mounted in the container image 106.

In some embodiments, the container image 106 may be configured to provide (e.g., send, transmit, deliver) the one or more images that are requested by the AUT 107 to the AUT 107.

In some embodiments, the container image 106 may be configured to pre-populate one or more volumes of the container image 106 with a full set of images that the AUT 107 may need to execute without interruption. In some embodiments, the container image 106 may be configured to determine that the full set of images are stored in the one or more volumes of the container image 106. In some embodiments, the container image 106 may be configured to generate, responsive to determining that the container image 106 includes the full set of images, a copy of itself. In some embodiments, the container image 106 may be configured to send the copy of the container image 106 to another computing device (e.g., a second CI system 102) to cause an application (e.g., a copy of the AUT 107) executing on the other computing device to execute the copy of the container image and/or to retrieve the full set of images from the copy of the container image that is executing on the other computing device. In other words, the volume that has been populated with the full set of images may be re-attached to an ad-hoc registry instance on the other computer device and server the full set of images to the application executing on the other computing device.

In some embodiments, the application development component 210a may be configured to acquire a registry image. In some embodiments, the registry image may be an empty registry image. In some embodiments, the application development component 210a may be configured to determine a full set of images associated with an execution of an application. In some embodiments, the application development component 210a may be configured to determine an absence of a subset of images of the full set of images in the registry image. In some embodiments, the application development component 210a may be configured to retrieve, responsive to determining the absence of the subset of images, the subset of images from the RI remote server 122. In some embodiments, the application development component 210a may be configured to store the subset of images in one or more layers of the registry image (shown in FIG. 1 as, "Registry Image 116") such that the registry image includes the full set of images. In some embodiments, the registry image may include a first image. In some embodiments, the application development component 210a may be configured to append a newer version of the first image to a last layer of the registry image, such that the older version of the first image is any of the previous layers. For example, the application development component 210a may build the registry image to include the following images: /path/for/image1v1, /path/for/image2v1, /path/for/image3v1, /path/for/image1v2.

The CI system 102 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the CI system 102 includes a plurality of network interfaces 206a of different types, allowing for connections to a variety of networks, such as local area networks (public or private) or wide area networks including the Internet, via different sub-networks.

The CI system 102 includes an input/output device 205a configured to receive user input from and provide information to a user. In this regard, the input/output device 205a is structured to exchange data, communications, instructions, etc. with an input/output component of the CI system 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of CI system 102, such as a built-in display, touch screen, microphone, etc., or external to the housing of CI system 102, such as a monitor connected to CI system 102, a speaker connected to CI system 102, etc., according to various embodiments. In some embodiments, the CI system 102 includes communication circuitry for facilitating the exchange of data, values, messages, and the like between the input/output device 205a and the components of the CI system 102. In some embodiments, the input/output device 205a includes machine-readable media for facilitating the exchange of information between the input/output device 205a and the components of the CI system 102. In still another embodiment, the input/output device 205a includes any combination of hardware components (e.g., a touchscreen), communication circuitry, and machine-readable media.

The CI system 102 includes a device identification component 207a (shown in FIG. 2A as device ID component 207a) configured to generate and/or manage a device identifier associated with the CI system 102. The device identifier may include any type and form of identification used to distinguish the CI system 102 from other computing devices. In some embodiments, to preserve privacy, the device identifier may be cryptographically generated, encrypted, or otherwise obfuscated by any device and/or component of CI system 102. In some embodiments, the CI system 102 may include the device identifier in any communication (e.g., a registry image request, application file request, application image request, etc.) that the CI system 102 sends to a computing device.

The CI system 102 includes a bus (not shown), such as an address/data bus or other communication mechanism for communicating information, which interconnects the devices and/or components of CI system 102, such as processing device 202a, network interface 206a, input/output device 205a, device ID component 207a, and application development component 210a.

In some embodiments, some or all of the devices and/or components of CI system 102 may be implemented with the processing device 202a. For example, the CI system 102 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the registry image (RI) remote server 122 of the environment in FIG. 1, according to some embodiments. While various devices, interfaces, and logic with particular functionality are shown, it should be understood that the RI remote server 122 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The RI remote server 122 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the RI remote server 122 instead of devices and/or components of the CI system 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the RI remote server 122 instead of devices and/or components of the CI system 102.

The processing device 202b may execute a registry image management component 210b that may be configured to receive a request (shown in FIG. 1 as, "Registry Image Request") from the CI system 102 for a registry image. In some embodiments, the registry image management component 210b may be configured to send, in response to receiving the request, the registry image to the CI system 102. In some embodiments, the registry image may be an empty registry image.

The RI remote server 122 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the RI remote server 122 instead of devices and/or components of the CI system 102.

The RI remote server 122 includes an input/output device 205b configured to receive user input from and provide information to a user. In this regard, the input/output device 205b is structured to exchange data, communications, instructions, etc. with an input/output component of the RI remote server 122. The input/output device 205b includes identical or nearly identical functionality as input/output processor 205a in FIG. 2A, but with respect to devices and/or components of the RI remote server 122 instead of devices and/or components of the CI system 102.

The RI remote server 122 includes a device identification component 207b (shown in FIG. 2B as device ID component 207b) configured to generate and/or manage a device identifier associated with the RI remote server 122. The device ID component 207b includes identical or nearly identical functionality as device ID component 207a in FIG. 2A, but with respect to devices and/or components of the RI remote server 122 instead of devices and/or components of the CI system 102.

The RI remote server 122 includes a bus (not shown), such as an address/data bus or other communication mechanism for communicating information, which interconnects the devices and/or components of the RI remote server 122, such as processing device 202b, network interface 206b, input/output device 205b, device ID component 207b, and the registry image management component 210b.

In some embodiments, some or all of the devices and/or components of RI remote server 122 may be implemented with the processing device 202b. For example, the RI remote server 122 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figures 2C, 2D:
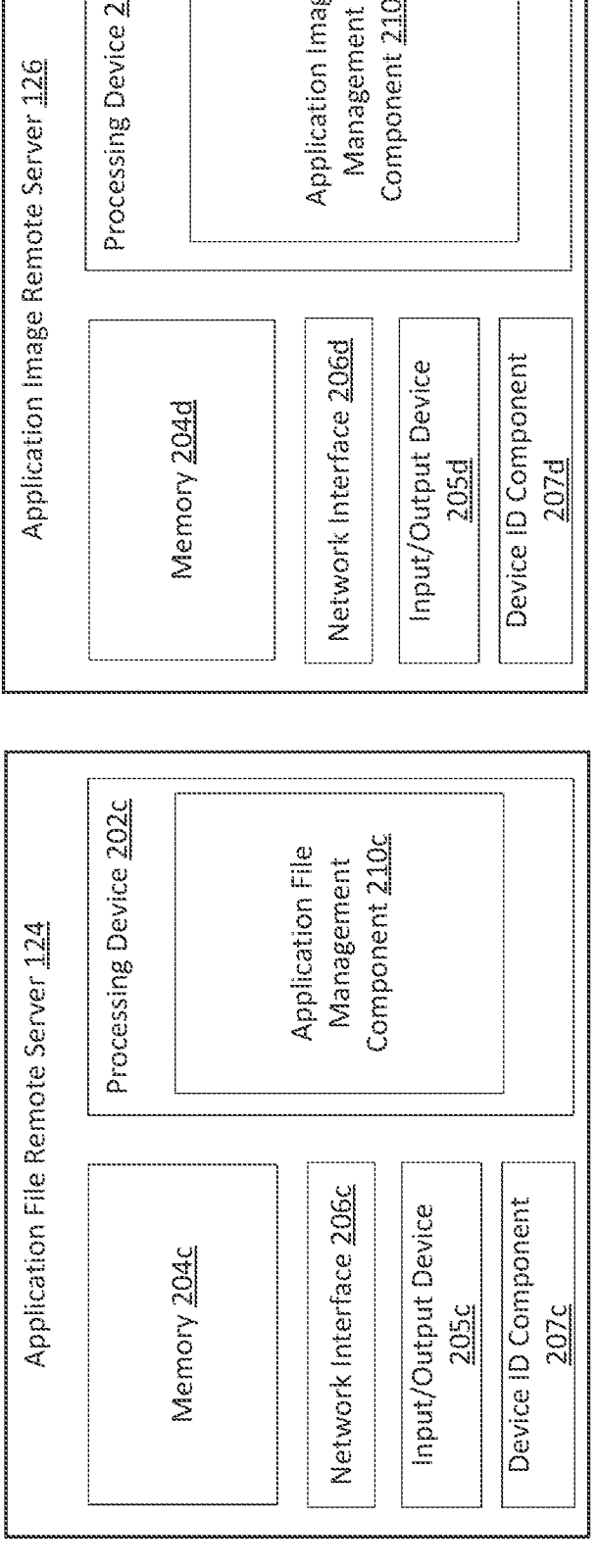
FIG. 2C is a block diagram depicting an example of the application file (AF) 124 of the environment in FIG. 1, according to some embodiments.
FIG. 2D is a block diagram depicting an example of the application image (AI) remote server 126 of the environment in FIG. 1, according to some embodiments.

FIG. 2C is a block diagram depicting an example of the application file (AF) remote server 124 of the environment in FIG. 1, according to some embodiments. While various devices, interfaces, and logic with particular functionality are shown, it should be understood that the AF remote server 124 includes any number of devices and/or components, interfaces, and logic for facilitating the functions described herein. For example, the activities of multiple devices may be combined as a single device and implemented on a same processing device (e.g., processing device 202c), as additional devices and/or components with additional functionality are included.

The AF remote server 124 includes a processing device 202c (e.g., general purpose processor, a PLD, etc.), which may be composed of one or more processors, and a memory 204c (e.g., synchronous dynamic random access memory (DRAM), read-only memory (ROM)), which may communicate with each other via a bus (not shown). The processing device 202c includes identical or nearly identical functionality as processing device 202a in FIG. 2a, but with respect to devices and/or components of the AF remote server 124 instead of devices and/or components of the CI system 102.

The memory 204c of processing device 202c stores data and/or computer instructions/code for facilitating at least some of the various processes described herein. The memory 204c includes identical or nearly identical functionality as memory 204a in FIG. 2A, but with respect to devices and/or components of the AF remote server 124 instead of devices and/or components of the CI system 102.

The AF remote server 124 includes a network interface 206c configured to establish a communication session with a computing device for sending and receiving data over a network to the computing device. Accordingly, the network interface 206c includes identical or nearly identical functionality as network interface 206a in FIG. 2A, but with respect to devices and/or components of the AF remote server 124 instead of devices and/or components of the CI system 102.

The AF remote server 124 includes an input/output device 205c configured to receive user input from and provide information to a user. In this regard, the input/output device 205c is structured to exchange data, communications, instructions, etc. with an input/output component of the AF remote server 124. The input/output device 205c includes identical or nearly identical functionality as input/output processor 205a in FIG. 2A, but with respect to devices and/or components of the AF remote server 124 instead of devices and/or components of the CI system 102.

The AF remote server 124 includes a device identification component 207c (shown in FIG. 2C as device ID component 207c) configured to generate and/or manage a device identifier associated with the AF remote server 124. The device ID component 207c includes identical or nearly identical functionality as device ID component 207a in FIG. 2A, but with respect to devices and/or components of the AF remote server 124 instead of devices and/or components of the CI system 102.

The processing device 202c may execute an application file management component 210c. In some embodiments, the application file management component 210c may be configured to store one or more application files in a local storage. In some embodiments, the application file management component 210c may be configured to receive a request (shown in FIG. 1 as, "Application File Request") from the CI system 102 for one or more application files. The application file management component 210c may be configured to send, in response to receiving the request, the one or more application files (shown in FIG. 1 as, "Application Files") to the CI system 102.

The AF remote server 124 includes a bus (not shown), such as an address/data bus or other communication mechanism for communicating information, which interconnects the devices and/or components of the AF remote server 124, such as processing device 202c, network interface 206c, input/output device 205c, device ID component 207c, and the application file management component 210c.

In some embodiments, some or all of the devices and/or components of the AF remote server 124 may be implemented with the processing device 202c. For example, the AF remote server 124 may be implemented as a software application stored within the memory 204c and executed by the processing device 202c. Accordingly, such embodiment can be implemented with minimal or no additional hardware costs. In some embodiments, any of these above-recited devices and/or components rely on dedicated hardware specifically configured for performing operations of the devices and/or components.

FIG. 2D is a block diagram depicting an example of the application image (AI) remote server 126 of the environment in FIG. 1, according to some embodiments. While various devices, interfaces, and logic with particular functionality are shown, it should be understood that the AI remote server 126 includes any number of devices and/or components, interfaces, and logic for facilitating the functions described herein. For example, the activities of multiple devices may be combined as a single device and implemented on a same processing device (e.g., processing device 202d), as additional devices and/or components with additional functionality are included.

The AI remote server 126 includes a processing device 202d (e.g., general purpose processor, a PLD, etc.), which may be composed of one or more processors, and a memory 204d (e.g., synchronous dynamic random access memory (DRAM), read-only memory (ROM)), which may communicate with each other via a bus (not shown). The processing device 202d includes identical or nearly identical functionality as processing device 202a in FIG. 2a, but with respect to devices and/or components of the AI remote server 126 instead of devices and/or components of the CI system 102.

The memory 204d of processing device 202d stores data and/or computer instructions/code for facilitating at least some of the various processes described herein. The memory 204d includes identical or nearly identical functionality as memory 204a in FIG. 2A, but with respect to devices and/or components of the AI remote server 126 instead of devices and/or components of the CI system 102.

The AI remote server 126 includes a network interface 206d configured to establish a communication session with a computing device for sending and receiving data over a network to the computing device. Accordingly, the network interface 206d includes identical or nearly identical functionality as network interface 206a in FIG. 2A, but with respect to devices and/or components of the AI remote server 126 instead of devices and/or components of the CI system 102.

The AI remote server 126 includes an input/output device 205d configured to receive user input from and provide information to a user. In this regard, the input/output device 205d is structured to exchange data, communications, instructions, etc. with an input/output component of the AI remote server 126. The input/output device 205d includes identical or nearly identical functionality as input/output processor 205a in FIG. 2A, but with respect to devices and/or components of the AI remote server 126 instead of devices and/or components of the CI system 102.

The AI remote server 126 includes a device identification component 207d (shown in FIG. 2D as device ID component 207d) configured to generate and/or manage a device identifier associated with the AI remote server 126. The device ID component 207d includes identical or nearly identical functionality as device ID component 207a in FIG. 2A, but with respect to devices and/or components of the AI remote server 126 instead of devices and/or components of the CI system 102.

The processing device 202d may execute an application image management component 210d. In some embodiments, the application image management component 210d may be configured to store one or more application files in a local storage. In some embodiments, the application image management component 210d may be configured to receive a request (shown in FIG. 1 as, "Application Image Request") from the CI system 102 for one or more images. The application image management component 210d may be configured to send, in response to receiving the request, the one or more images (shown in FIG. 1 as, "Application Images") to the CI system 102.

The AI remote server 126 includes a bus (not shown), such as an address/data bus or other communication mechanism for communicating information, which interconnects the devices and/or components of the assignee device 110, such as processing device 202d, network interface 206d, input/output device 205d, device ID component 207d, and/or the application image management component 210d.

In some embodiments, some or all of the devices and/or components of the AI remote server 126 may be implemented with the processing device 202d. For example, the AI remote server 126 may be implemented as a software application stored within the memory 204d and executed by the processing device 202d. Accordingly, such embodiment can be implemented with minimal or no additional hardware costs. In some embodiments, any of these above-recited devices and/or components rely on dedicated hardware specifically configured for performing operations of the devices and/or components.

FIG. 3 is a flow diagram depicting a method for prepopulating a container image repository for continuous integration (CI/CD) environments using volumes, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by an issue tracking system, such as CI system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of executing, by the processing device, a container image that is configured as an image repository mirror for a remote server. The method 300 includes the block 304 of executing, by the processing device, an application to cause the application to provide a request for one or more images to the container image. The method 300 includes the block 306 of determining, by the container image, an absence of the one or more images in the container image. The method 300 includes the block 308 of retrieving, by the container image responsive to determining the absence of the one or more images, the one or more images from the remote storage. The method 300 includes the block 310 of providing, by the container image, the one or more images retrieved from the remote storage to the application.

Figure 4:
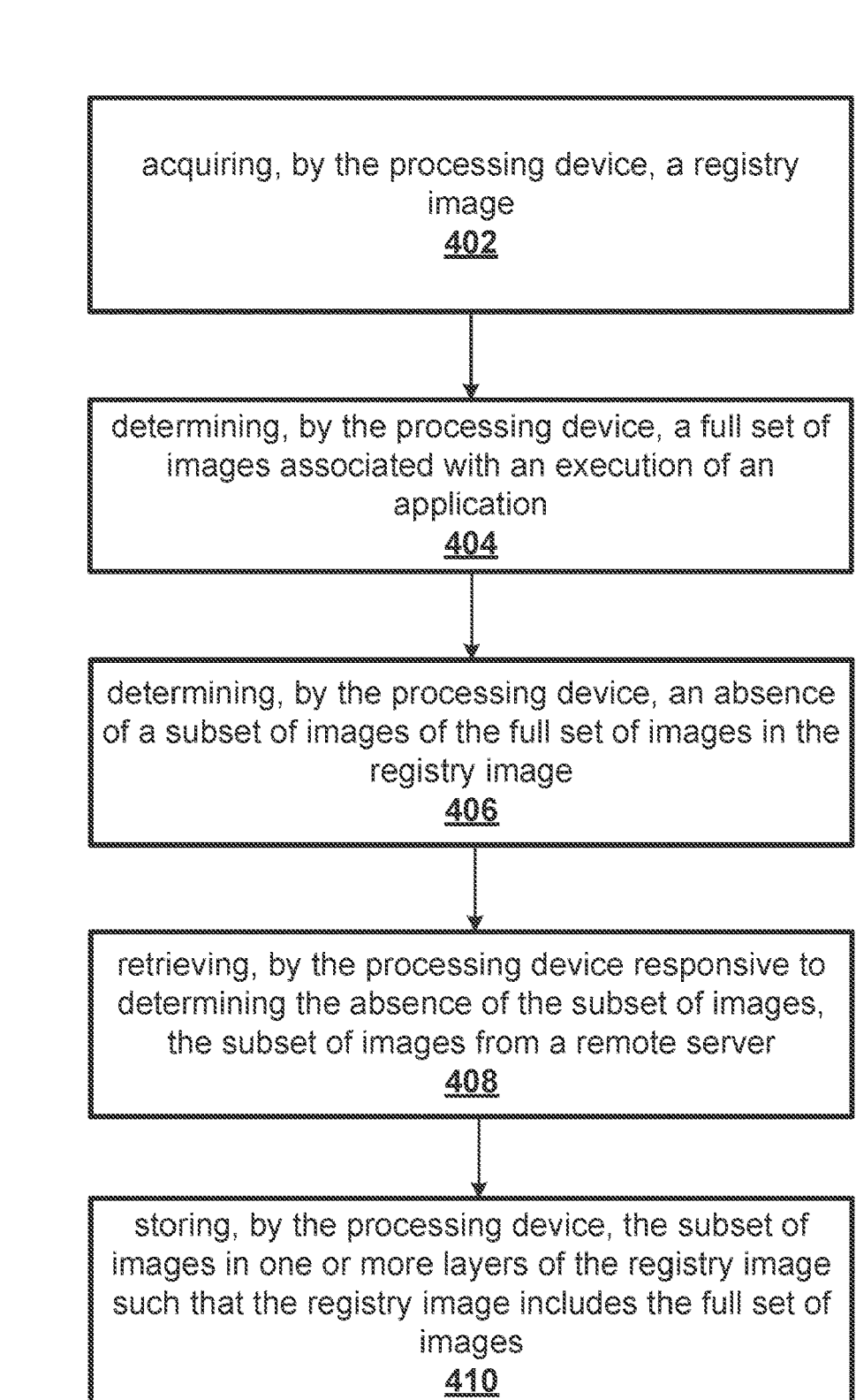
FIG. 4 is a flow diagram depicting a method for prepopulating a container image repository for continuous integration (CI/CD) environments using layered images, according to some embodiments.

FIG. 4 is a flow diagram depicting a method FIG. 4 is a flow diagram depicting a method for prepopulating a container image repository for continuous integration (CI/CD) environments using layered images, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by an issue tracking system, such as CI system 102 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of acquiring, by the processing device, a registry image. The method 400 includes the block 404 of determining, by the processing device, a full set of images associated with an execution of an application. The method 400 includes the block 406 of determining, by the processing device, an absence of a subset of images of the full set of images in the registry image. The method 400 includes the block 408 of retrieving, by the processing device responsive to determining the absence of the subset of images, the subset of images from a remote server. The method 400 includes the block 410 of storing, by the processing device, the subset of images in one or more layers of the registry image such that the registry image includes the full set of images.

Figure 5:
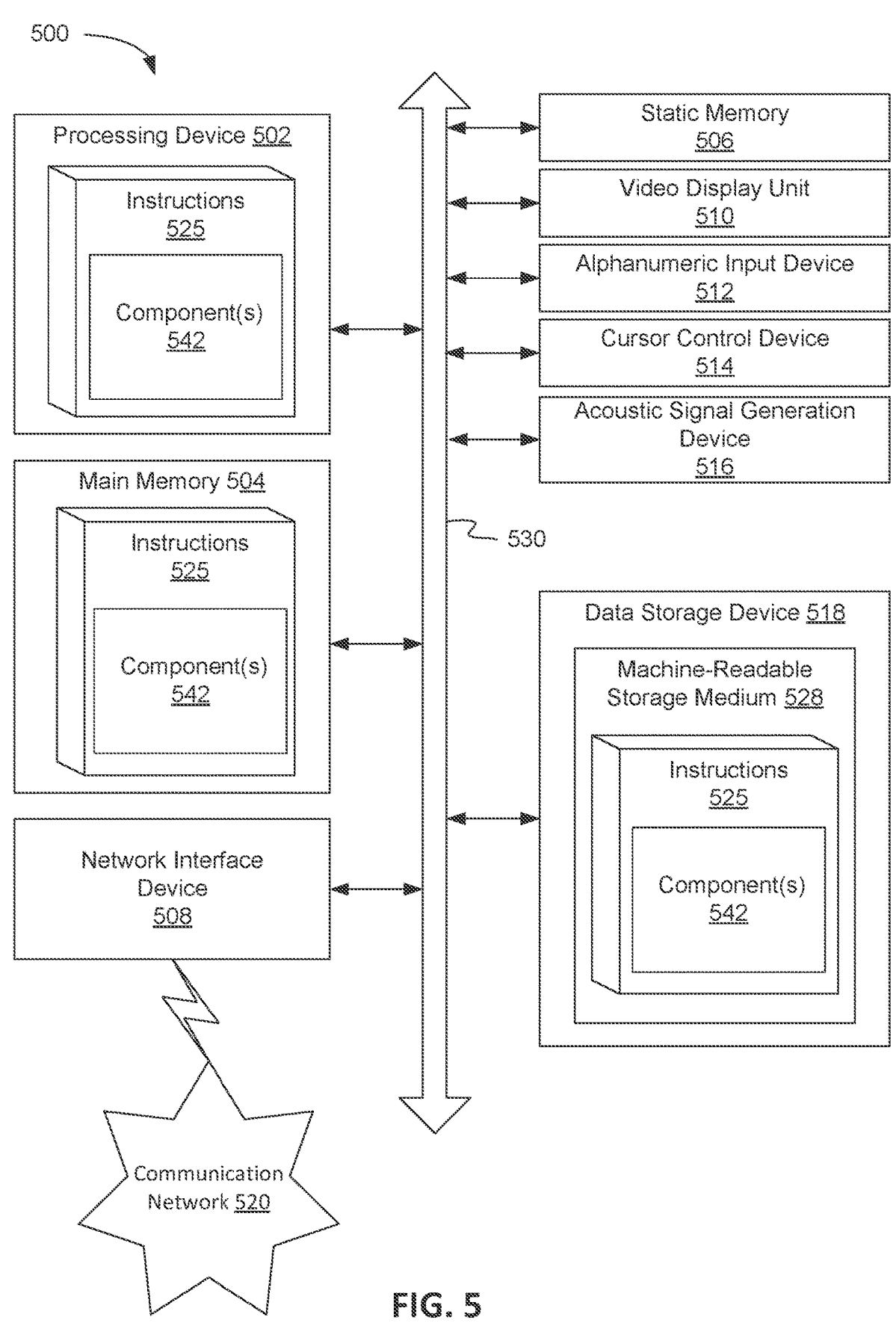
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components 142 (e.g., application development component 210a in FIG. 2A, registry image management component 210b in FIG. 2B, application file management component 210c in FIG. 2C, and/or application image management component 210d in FIG. 2D) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "executing," "determining," "retrieving," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

executing a container image that is configured as an image repository mirror for a remote server, wherein the container image is further configured to generate a copy of the container image when the container image comprises a full set of images;

executing, by a processing device, an application that is configured to provide a request for one or more images to the remote server;

reconfiguring the application to cause the application to provide the request for the one or more images to the container image instead of the remote server;

populating the container image by appending a newer version of a first image retrieved from the remote server as a last layer of the container image such that an older version of the first image is retained in one of previous layers of the container image, thereby to cause the container image to determine that the container image comprises the full set of images and generate the copy of the container image; and serving the newer version of the first image to a different server by attaching the copy of the container image to an ad-hoc registry instance of the different server, wherein the ad-hoc registry instance is instantiated in a continuous integration or deployment (CI/CD) environment, and the copy of the container image is configured to serve the full set of images across multiple application executions in the CI/CD environment.

2. The method of claim 1, further comprising executing a plurality of commands of a text document to generate the container image that is configured as the image repository mirror for the remote server, wherein the container image comprises a plurality of image layers that are each respectively associated with a command of the plurality of commands.

3. The method of claim 1, further comprising:

determining an absence of the one or more images in the container image;

retrieving the one or more images; and providing the one or more images retrieved to the application.

4. The method of claim 1, further comprising:

storing the one or more images in one or more volumes of the container image.

5. The method of claim 1, further comprising:

determining the full set of images associated with the execution of the application by the processing device;

determining an absence of a subset of images of the full set of images in the container image;

retrieving, responsive to determining the absence of the subset of images, the subset of images from the remote server; and storing the subset of images in one or more volumes of the container image such that the container image includes the full set of images.

6. The method of claim 1, further comprising:

configuring the container image as the image repository mirror for the remote server by mounting a directory of a file system associated with a local storage of the processing device in the container image.

7. The method of claim 1, further comprising:

configuring the application to direct the request for the one or more images to the container image instead of the remote server.

8. The method of claim 1, further comprising:

generating the container image based on an empty registry image.

9. A system comprising:

a memory; and a processing device, operatively coupled to the memory, to:

execute a container image that is configured as an image repository mirror for a remote server, wherein the container image is further configured to generate a copy of the container image when the container image comprises a full set of images;

execute an application that is configured to provide a request for one or more images to the remote server;

reconfigure the application to cause the application to provide the request for the one or more images to the container image instead of the remote server;

populate the container image by appending a newer version of a first image retrieved from the remote server as a last layer of the container image such that an older version of the first image is retained in one of previous layers of the container image, thereby to cause the container image to determine that the container image comprises the full set of images and generate the copy of the container image; and serve the newer version of the first image to a different server by attaching the copy of the container image to an ad-hoc registry instance of the different server;

wherein the ad-hoc registry instance is instantiated in a continuous integration or deployment (CI/CD) environment, and the copy of the container image is configured to serve the full set of images across multiple application executions in the CI/CD environment.

10. The system of claim 9, wherein the processing device is further to:

execute a plurality of commands of a text document to generate the container image that is configured as the image repository mirror for the remote server, wherein the container image comprises a plurality of image layers that are each respectively associated with a command of the plurality of commands.

11. The system of claim 9, wherein the processing device is further to:

determine an absence of the one or more images in the container image;

retrieve the one or more images; and provide the one or more images retrieved to the application.

12. The system of claim 9, wherein the processing device is further to:

store the one or more images in one or more volumes of the container image.

13. The system of claim 9, wherein the processing device is further to:

determine the full set of images associated with the execution of the application by the processing device;

determine an absence of a subset of images of the full set of images in the container image;

retrieve, responsive to determining the absence of the subset of images, the subset of images from the remote server; and store the subset of images in one or more volumes of the container image such that the container image includes the full set of images, wherein the processing device executes the application after storing the subset of images in the one or more volumes of the container image.

14. The system of claim 9, wherein the processing device is further to:

configure the container image as the image repository mirror for the remote server by mounting a directory of a file system associated with a local storage of the processing device in the container image.

15. The system of claim 9, wherein the processing device is further to:

configure the application to direct the request for the one or more images to the container image instead of the remote server.

16. The system of claim 9, wherein the processing device is further to:

generate the container image based on an empty registry image.

17. A non-transitory computer-readable medium storing instructions that, when executed by a processing device, cause the processing device to:

execute a container image that is configured as an image repository mirror for a remote server, wherein the container image is further configured to generate a copy of the container image when the container image comprises a full set of images;

execute, by the processing device, an application that is configured to provide a request for one or more images to the remote server;

reconfigure the application to cause the application to provide the request for the one or more images to the container image instead of the remote server;

populate the container image by appending a newer version of a first image retrieved from the remote server as a last layer of the container image such that an older version of the first image is retained in one of previous layers of the container image, thereby to cause the container image to determine that the container image comprises the full set of images and generate the copy of the container image; and serve the newer version of the first image to a different server by attaching the copy of the container image to an ad-hoc registry instance of the different server;

wherein the ad-hoc registry instance is instantiated in a continuous integration or deployment (CI/CD) environment, and the copy of the container image is configured to serve the full set of images across multiple application executions in the CI/CD environment.

* * * * *